United States Patent
Ogata et al.

[11] Patent Number: 5,270,840
[45] Date of Patent: Dec. 14, 1993

[54] IMAGE SENSOR AND MACHINE EQUIPPED THEREWITH

[75] Inventors: Hiromi Ogata; Seiji Koshikawa, both of Kyoto, Japan

[73] Assignee: Rohm Co., Ltd., Kyoto, Japan

[21] Appl. No.: 811,616

[22] Filed: Dec. 23, 1991

[30] Foreign Application Priority Data

Dec. 28, 1990 [JP] Japan .................. 2-409504

[51] Int. Cl.⁵ .................. H04N 1/028; H04N 1/23
[52] U.S. Cl. .................. 358/482; 358/496; 358/296; 359/710
[58] Field of Search .......... 358/474, 475, 487, 494, 358/296, 496, 472, 482; 355/228, 229, 232, 233; 250/208.1; 359/710, 798

[56] References Cited

U.S. PATENT DOCUMENTS

| | | | |
|---|---|---|---|
| 3,967,893 | 7/1976 | Majewicz | 355/229 |
| 4,466,020 | 8/1984 | O'Connell | 358/482 |
| 4,680,644 | 7/1987 | Shirato et al. | 358/474 |
| 4,952,972 | 8/1990 | Someya | 358/475 |
| 4,970,607 | 11/1990 | Itagaki et al. | |
| 5,125,047 | 6/1992 | Ito et al. | 358/496 |

FOREIGN PATENT DOCUMENTS 0153002 1/1985 European Pat. Off.
0294834 6/1988 European Pat. Off.
63-185159 7/1988 Japan.

OTHER PUBLICATIONS

Patent Abstracts of Japan, vol. 13, No. 8 (E-702) Jan. 10, 1989 and JP-A-63 217 870 (Mitsubishi Electric Corp.) Sep. 9, 1988.

*Primary Examiner*—Edward L. Coles, Sr.
*Assistant Examiner*—Scott A. Rogers
*Attorney, Agent, or Firm*—Fish & Richardson

[57] ABSTRACT

In an image sensor including a light emitting element for emitting a light beam to be incident on a document, a light receiving element for receiving the light beam reflected by the document, and a lens array for directing the reflected light beam from the document to the light receiving element, there is located a mirror between the lens array and the light receiving element for changing the direction of the light beam passing through the lens array. The light emitting element and the light receiving element are located on the same substrate. With this arrangement, a compact and inexpensive image sensor can be achieved. This compact image sensor causes an increased amount of light to be incident on the document.

4 Claims, 2 Drawing Sheets

IMAGE SENSOR AND MACHINE EQUIPPED THEREWITH

BACKGROUND OF THE INVENTION

1. Field of the Invention

This invention relates to a small-sized image sensor for reading information such as characters and symbols in a document, and a machine equipped with such an image sensor.

2. Description of the Related Art

It is currently known to have an image sensor for reading characters and symbols in a document by applying light onto the document from a light source in the form of an array of parallel light emitting elements such as LEDs and by receiving light reflected from the document by an array of light receiving elements which perform photoelectric conversion. Generally, this known image sensor comprises a light emitting element array, a light receiving element array, and an optical system for directing the light from the light emitting array to the document and then directing the reflected light from the document to the light receiving element array, the light emitting array being fixed to a substrate such as glass epoxy by soldering. The light receiving element array is formed by monolithic IC technology or the like, and is fixed to, for example, a ceramic substrate by an adhesive. The optical system is a rod array lens fixed to the frame of the image sensor at a desired position by screws.

Since the light emitting elements and the light receiving elements are supported on two separate substrates, this known image sensor must be assembled in an increased number of steps, which is laborious and expensive. To cope with this problems, it has been proposed to provide a light-path changing means between the light emitting element and the document and to mount both the light emitting element and the light receiving element on the same substrate.

However, in this prior arrangement in which the light-path changing means such as a mirror is located between the light emitting element and the document, since the distance between the light emitting element and the document is necessarily increased, an adequate amount of light can not be applied to the document, thus reducing the reading rate.

SUMMARY OF THE INVENTION

It is therefore an object of this invention to provide a image sensor which is compact in size and easy to assemble, enabling an improved document reading rate.

In the image sensor of this invention, a mirror is located between a lens array and a light receiving element, and both a light emitting element and the light receiving element are mounted on the same substrate.

According to this invention, partly since the mirror is located between the light receiving element and the lens array rather than between the light emitting element and the document, both the light emitting element and the light receiving element can be mounted on the same substrate to reduce the distance between the light emitting element and the document, thus increasing the amount of light incident on the document and hence improving the reading rate.

DETAILED DESCRIPTION OF THE PREFERRED EMBODIMENTS

Figure 1:
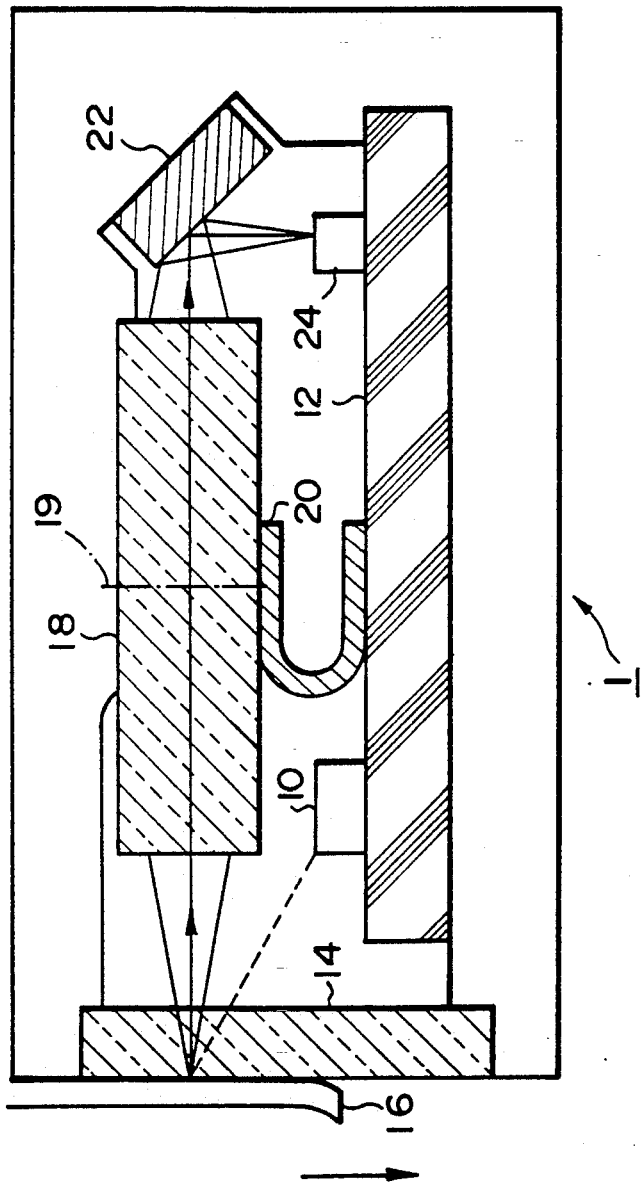
FIG. 1 is a schematic cross-sectional view showing an image sensor according to one embodiment of this invention.

The principles of this invention are particularly useful when embodied in an image sensor such as shown in FIG. 1.

In the image sensor, as shown in FIG. 1, a light emitting array 10 composed of a plurality of parallel LEDs is arranged on a substrate 12 such as a ceramic material. The light from the light emitting element array 10 is incident on a predetermined line of a document 16 via a glass plate 14, and the reflected light from the document 6 is incident on a cylindrical lens array 18 which condenses the incident light.

In this embodiment, the cylindrical lens array 18 has an effective length (TC) of 14.4 mm and is resiliently supported on the substrate 12 by a resilient support member 20 which also serves as a shield plate to prevent light from the light emitting element array 10 from being incident on the light receiving element described below. If the surface which faces towards the light emitting element array 10 is coated so as to be reflective, the support member 20 can also serve as a reflector which assists in increasing the amount of light to be applied to the document 16.

The light condensed by the cylindrical lens array 18 is directed to the light receiving element. As a significant feature of this embodiment, a mirror 22 is located between the cylindrical lens array 18 and the light receiving element to change the direction of light so that a light receiving element array 24 can be mounted on the substrate 12 on which the light emitting element array 10 is located.

The direction of the light ejected from the cylindrical lens array 18 is changed by a desired angle by the mirror 22 so that the light is directed to the light receiving array 24 located on the substrate 12 at a position more remote from the document than the light emitting element array 10. Assuming that a is a distance between the center line 19 of the cylindrical lens array 18 and the mirror 22 and b is a distance between the mirror 22 and the light receiving element 24, the mirror 22 and the light receiving element 24 are arranged in such a manner that $a+b=TC/2$ is satisfied. The center line 19 passes through the center of the cylindrical lens array, 18 and is perpendicular to its optical axis.

Thus, in this embodiment, since the mirror 22 is located between the cylindrical lens array 18 and the light receiving element array 24 rather than between the light emitting element array 10 and the document 16, it is possible to reduce the distance between the light emitting element array 10 and the document 16 so that the amount of light which is incident on the document can be increased.

Further, since the light emitting element array 10 and the light receiving element array 24 can be located on the same substrate 12 so as to satisfy the lengthwise limit of TC of the cylindrical lens array 18, a compact image sensor which is easy to assemble can be achieved. In the image sensor of this embodiment, by arranging the substrate 12, on which the light emitting element array 10 and the light receiving element array 24 are mounted, and the cylindrical lens array 18 in parallel relationship, it is possible to achieve an image sensor having a width of about 10 mm.

With this arrangement, the light from the light emitting element 10 is incident on the document 16 through the glass plate 14. Then the document 16 reflects the incident light. Since this reflected light is scattering, the scattering light is condensed by the cylindrical lens array 18 and is then incident on the mirror 22 where the direction of the light is changed. Finally the light is incident on the light receiving element 24 mounted on the substrate 12 on which the light emitting element 10 is located. During that time, the amount of light is reduced to the minimum at the time of reflection on the document 16. This is because the reflected light from the document 16 is scattering. According to this embodiment, however, since the distance between the light emitting element 10 and the document 16 is small, the amount of reduction of light is smaller than conventionally. As a result, the amount of light which is incident on the document 16 is increased so that the amount of light to be reflected by the document 16 will also be increased. This large amount of reflected light is condensed by the cylindrical lens array 18, and the condensed light is incident on the light receiving element 24 via the mirror 22. Further, since the sum of the distance between the center line 19 of the cylindrical lens array 18 and the mirror 22 and the distance between the mirror 22 and the light receiving element 24 is set to $\frac{1}{2}$ of the effective length of the cylindrical lens array 18, the light will be focused on the light receiving element 24. Accordingly it is possible to precisely grasp the shape of a pattern on the document 16.

Figure 2:
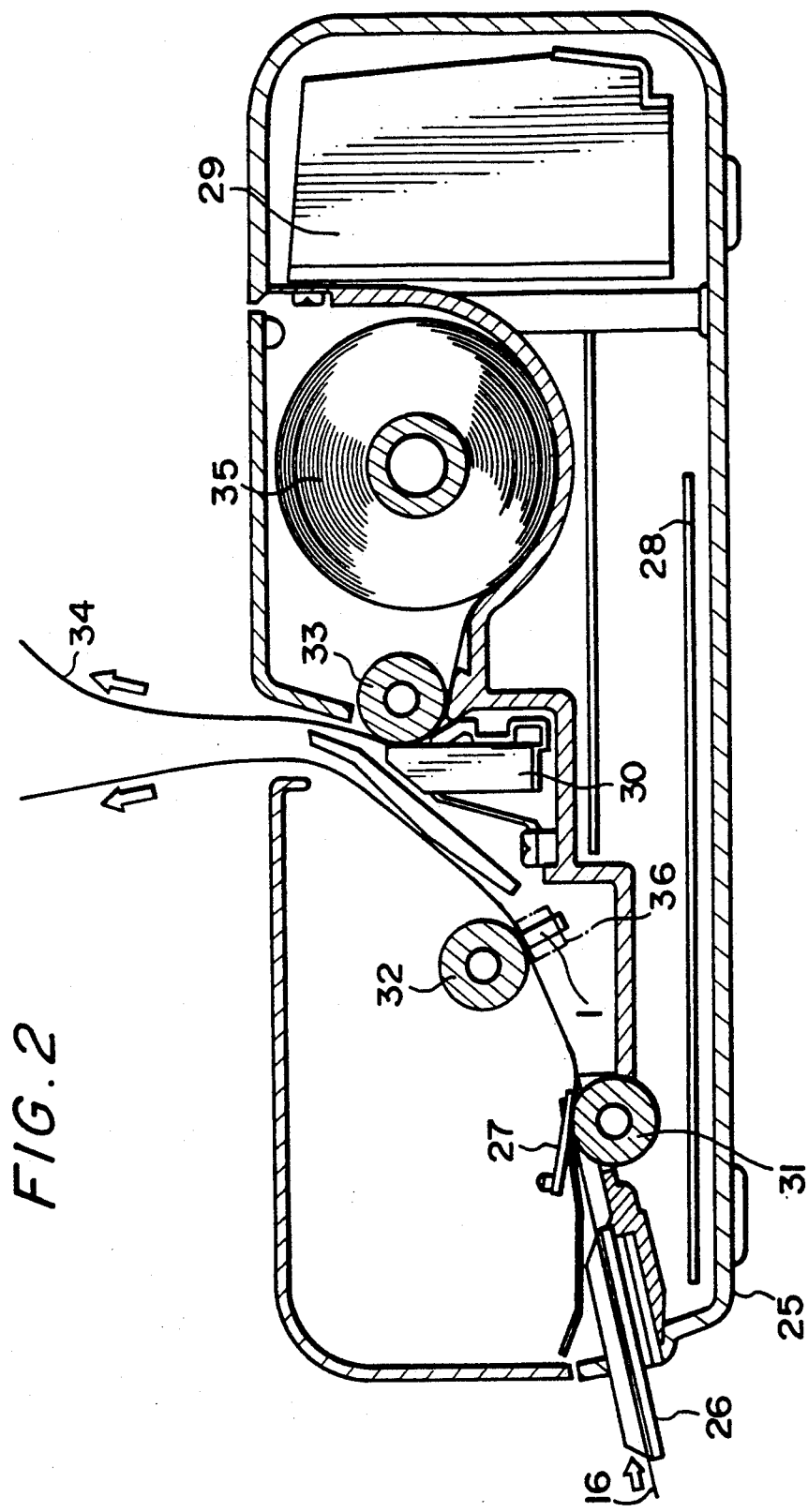
FIG. 2 is a cross-sectional view showing a copying machine which is equipped with the image sensor of FIG. 1.

FIG. 2 shows a thermal transfer copying machine in which the image sensor of this embodiment is incorporated.

This copying machine generally comprises a housing 25, an inlet 26 through which documents 16 are to be inserted into the machine, a separating means 27 for separating the inserted documents 16 from one another, a system control substrate 28 supporting the interior mechanism of the machine, a power source 29 for driving the machine, the image sensor 1 of this embodiment, and a thermal printer head 30. In this machine, the content of the document 16 is read by the image sensor 1 and is then printed on a recording paper 34 by the thermal printer head 30.

Specifically, the documents 16 inserted into the machine from the inlet 26 are separated from one another by the separating means 27 before being sent toward the image sensor 1 by a feed roller 31. The document 16 fed by the feed roller 31 arrives at a platen roller 32. The image sensor 1 is located near the platen roller 32 in a confronting relationship therewith. Therefore, when the pattern on the surface of the document 16 is detected by the image sensor 1, the thermal printer head 30 is driven based on this detected information. Since the thermal printer head 30 performs printing on the recording paper 34 based on the detected information of the image sensor 1, such printing corresponds to the pattern on the surface of the document 16. Thus the pattern identical with that on the surface of the document 16 is described on the recording paper 34 as the recording paper 34 is progressively fed to the thermal printer head 30 from a stack 35 by a recording platen roller 33.

As is apparent from FIG. 2, the image sensor 1 of this embodiment is smaller in width than the conventional image sensor 36, which is indicated by dash-and-dot lines. Namely, the width of the image sensor 1 is about 10 mm, which is about a half the width of the conventional image sensor 36. Since the platen roller 32 has a circular cross section, it should be preferable to reduce the contact area of the image sensor to a minimum. This fact is also apparent from FIG. 2. In addition, since the distance between the light emitting element and the document is small, it is possible to increase the amount of light incident on the surface of the document 16 so that an improved degree of reading precision can be realized. By using this small-width and high-precision image sensor 1, it is possible to manufacture a small-sized and high-precision copying or printing machine.

According to the image sensor of this invention, since the mirror as a light-path changing means is located between the lens array and the light receiving element, it is possible to mount both the light emitting element array and the light receiving element array on the same substrate. Therefore a small-sized, inexpensive and high-performance machine, in which the distance between the light emitting array and the document is reduced in order to increase the amount of light incident on the document, can be realized.

What is claimed is:

1. An image sensor comprising:
   a) a frame;
   b) a substrate housed in said frame;
   c) a light emitting element mounted on said substrate for emitting a light beam to be incident on a document;
   d) a light-path changing means for changing the direction of the light beam reflected by the document, said light-path changing means being housed in said frame and comprising a mirror;
   e) a light receiving element mounted on said substrate for receiving the light beam from said light-path changing means;
   f) a cylindrical lens array for directing the light beam reflected by the document to said light-path changing means, said cylindrical lens array being housed in said frame and including a center line which is perpendicular to an optical axis of said cylindrical lens array; and
   g) said light emitting element is located on said substrate at a position near the document, and said light receiving element is located on said substrate at a different position farther from the document than said light emitting element;
   h) wherein said cylindrical lens array and said substrate are disposed substantially in parallel to each other in said frame and wherein said mirror and said light receiving element are arranged in such a manner that the sum of the distance between the center line of said cylindrical lens array and said light receiving element and the distance between said light receiving element and said mirror is $\frac{1}{2}$ of an effective length of said cylindrical lens array.

2. An image sensor according to claim 1, wherein said cylindrical lens array has an effective length of 14.4 mm.

3. A printer comprising:
   A) means for feeding an original;
   B) means for supplying a printing paper;

C) an image sensor converting a pattern on a surface of the original into electrical signals; said image sensor including
a) a frame,
b) a substrate housed in said frame,
c) a light emitting element mounted on said substrate for emitting a light beam to be incident on a document;
d) a light-path changing means for changing the direction of the light beam deflected by the document, said light-path changing means being housed in said frame and comprising a mirror,
e) a light receiving element mounted on said substrate for receiving the light beam for said light-path changing means;
f) a cylindrical lens array for directing the light beam reflected by the document to said light-path changing means, said cylindrical lens array housed in said frame and including a center line which is perpendicular to an optical axis of said cylindrical lens array; and
g) said light emitting element is located on said substrate at a position near the document, and said light receiving element is located on said substrate at a different position farther from the document than said light emitting element;
h) whereby said cylindrical lens array and said substrate are disposed substantially in parallel to each other and wherein said mirror and said light receiving element are arranged in such a manner that the sum of the distance between the center line of said cylindrical lens array and said light receiving element and the distance between said light receiving element and said mirror is ½ of an effective length of said cylindrical lens array; and D) a terminal head for generating heat based on the electrical signals issued from said image sensor.

4. An image sensor printer according to claim 2, wherein said cylindrical lens array has an effective length of 14.4 mm.

* * * * *